United States Patent Office 3,652,713
Patented Mar. 28, 1972

3,652,713
POLYESTER COMPOSITION HAVING IMPROVED ANTISTATIC PROPERTIES, AND PROCESS FOR THE PREPARATION THEREOF
Kaoru Okazaki, Shunroku Tohyama, Minoru Nakata, and Kiyomi Kishimoto, Nagoya-shi, Japan, assignors to Toray Industries, Inc., Tokyo, Japan
Filed Feb. 13, 1970, Ser. No. 11,041
Claims priority, application Japan, Feb. 18, 1969, 44/11,475; Feb. 21, 1969, 44/12,507
Int. Cl. C08g 39/10
U.S. Cl. 260—860                                   20 Claims

ABSTRACT OF THE DISCLOSURE

A polyester composition consisting of a polyetherpolyester block copolymer consisting of a polyether segment and a polyester segment, the average degree of polymerization of said polyether segment being 100–1,000 and the polyester segment being a synthetic linear polyester. The composition forms fibers, bristles, films and other three-dimensional shaped articles, and has improved antistatic properties.

---

The present invention relates to a polyester composition having highly improved antistatic properties, and to a method for making the same. More particularly, the invention relates to such a polyester composition which is ideally constituted for forming fibers, bristles, films and other three-dimensional shaped articles.

It is know that shaped articles, for example, fibers, bristles and films obtained from polyethylene terephthalate or copolymers thereof, poly-1, 4-cyclohexanedimethyl terephthalate or copolymers thereof, and polyesters obtained from para-oxyethoxybenzoic acid or copolymers thereof have high crystallinity, high softening points, and excellent performance in respect of tenacity, elongation, flexural strength, chemical resistance, light resistance and heat resistance, and have great value industrially.

However, aside from such merits as mentioned above, they also have deficiencies in that their dyeability is poor, they are readily charged with static electricity, and in fabrics they are susceptible to pilling. Therefore, their uses are somewhat limited. Their tendency to charge with static electricity is one of the most serious deficiencies. In fabrics worn as clothing and the like, especially in dry air, they have a marked tendency to charge with static electricity, displaying undesirable properties such as crackling sounds and clinging to the body of the wearer. Further, they tend to absorb dust and in many cases they become quite soiled after only a limited period of wear. This so-called electrostatic obstacle is encountered not only in a shaped article consisting of polyester alone, but also in so-called mix spun fibers consisting of polyester fibers spun with, for example, cotton, wool or rayon.

Heretofore, various attempts have been made to modify such polyesters to reduce the static electricity problems. For example, the following have been proposed: (a) a method involving aftertreating the synthetic fiber with a quaternary ammonium salt as disclosed in German Pat. No. 1,154,266, (b) antistatic methods involving copolymerization as by copolymerizing with N,N' - piperazinedicarboxylic acid as disclosed in Japanese patent publication No. 346/1964 (c) copolymerizing with alkyl glycidyl ether as disclosed in Hungarian Pat. No. 150,851 (d) so-called knearing methods such as mixing a high molecular weight polyalkylene glycol and spining the mixture as disclosed in Japanese patent publication No. 5214/1964. However, all of these methods have some deficiency or other, and their practice on an industrial scale is difficult. For example, in the aftertreatment method, being a method of adhering an antistatic agent to the surface of a fiber, the antistatic agent tends to become removed by washing and other treatments; even though an effect is obtained, it is only temporary. On the other hand, in the copolymerization methods and the kneading method, when an attempt is made to obtain a sufficient effect, either the desirable physical properties of the polyester are harmed or yellowing is brought about. Therefore, these methods are difficult to practice. Further, in the method of mixing a polyalkylene ether glycol in a synthetic resin, the particles tend to be extracted and removed relatively easily, because the polyalkylene ether glycol existing as dispersed particles in the synthetic resin is water soluble. Accordingly, in the process of aftertreatment such as scouring whenever washing or the like is carried out, the beneficial effect decreases and the antistatic property is only temporary.

An object of the present invention is to provide a synthetic linear polyester composition which has excellent antistatic properties and which is free from the aforementioned deficiencies.

Another object of the present invention is to provide a synthetic linear polyester composition having good antistatic properties over an extended period of time which comprises mixing a synthetic linear polyester with a specified polyether-polyester block copolymer so that the latter may be present in a specified ratio, and to provide a process for the preparation thereof.

Still another object of the present invention is to provide a synthetic linear polyester composition most suitable for forming fibers, bristles, films and other three-dimensional, shaped articles, especially a synthetic linear polyester fiber and a process for the preparation thereof.

Further objects of the present invention will become apparent from the following description.

The aforesaid objects of the present invention are achieved by preparing a synthetic linear polyester composition which is a mixture of (a) a polyether-polyester block copolymer consisting essentially of a synthetic linear polyether segment and a synthetic linear polyester segment, said polyether segment having a general formula of

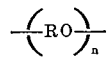

(wherein R stands for one or more divalent organic groups and $n$ stands for an integer of about 100 to 1000) and which is present in an amount of about 10% to about 97.5% by weight, preferably about 30–95% by weight, of said polyether-polyester block copolymer, with (b) a synthetic linear polyester having repeating constitutional units, at least about 80% by weight of which correspond to the formula

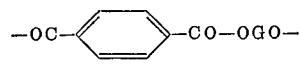

wherein G is selected from the group consisting of an aliphatic hydrocarbon group and an alicyclic hydrocarbon group each having about 2–10 carbon atoms, sometimes as many as 15 or more alicyclic, said polyether segment being present in an amount of about 0.1–10.0% by weight, preferably about 0.3–5% by weight based on the total weight of said mixture.

Compositions according to this invention may be prepared as follows: a synthetic linear polyester is formed by normal (melt) polymerization. At any stage before completion of the melt polymerization of the synthetic linear polyester, a poly(alkylene) ether having an average degree of polymerization of about 100–1,000 is added to the polymerization system and copolymerized there-with. Further, when it is necessary to increase the degree of polymerization, the resulting polyether-polyester block copolymer is further polymerized in a solid state to increase its relative viscosity to at least about 2.5. It contains about 10.0–97.5% by weight, preferably 30–95% by weight of the polyether segment and for convenience is referred to as polymer A in describing the present invention.

On the other hand, a synthetic linear polyester, at least about 80% of whose acid component is terephthalic acid or terephthalic acid groups, substantially free of any polyether segment is prepared. This polymer is referred to as polymer B in describing the present invention. The so-obtained polymer A and polymer B are so mixed that the amount of the polyether segment may become 0.1–10.0% by weight, preferably 0.3–5% by weight, based on the total weight of the mixed composition finally obtained.

Upon practicing the present invention, the melt viscosity ratio of polymer A to polymer B, has an influence upon the effect of the present invention; it is preferred to adjust the melt viscosity at 290° C. of the polymer A to 0.1–10.0 times, preferably 0.1–2.0 times that of polymer B at the same temperature. Such adjustment of the melt viscosity may be accomplished by normal means, for example, by selection of the polymerization conditions. However, the following means is especially effective: Before completion of the melt polymerization of the polyester, at least 80% of whose acid component is terephthalic acid, a polyalkylene ether having a degree of polymerization of about 100–1,000 and a compound having at least three ester-forming functional groups are added and the resulting mixture is further melt polymerized, and the relative viscosity of the resulting polyether-polyester block copolymer is adjusted to at least 2.5, preferably 3.0–10.0. It contains about 10.0–97.5% by weight, preferably 30–95% by weight of a polyether segment (polymer A) and is so blended with the polyester (polymer B) that the melt viscosity ratio of polymer A to polymer B at 290° C. (the melt viscosity of polymer A/the melt viscosity of polymer B) is in the range of about 0.1–10.0, preferably about 0.1–2.0, to produce a composition according to the present invention.

Hereinbelow, the present invention will be explained specifically.

The polyester for preparing a polyether-polyester block copolymer used in the practice of the present invention is a synthetic linear polyester, prepared from dicarboxylic acids like aliphatic dicarboxylic acids such as oxalic acid, adipic acid, azelaic acid and sebacic acid, aromatic dicarboxylic acids such as terephthalic acid, isophthalic acid and 2,6-naphthalenedicarboxylic acid, or the ester forming derivatives thereof, and alicyclic dicarboxylic acids such as 1,3- and 1,4-cyclohexanedicarboxylic acid and diols such as ethylene glycol, diethylene glycol, propylene glycol, butanediol, p-xylylene glycol and 1,4-cyclohexanedimethanol. These polyesters may be homopolymers and copolymers. Polyethylene terephthalate is preferably used.

Polyethers consisting mainly of polyalkylene ether are used as the polyether segment in the practice of the present invention. Such polyalkylene ethers are high molecular polymers having an average degree of polymerization of about 100–1,000, being represented by the formula

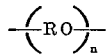

wherein R is one or more types of divalent organic group. Such compounds include, for example, polyethylene glycol, polypropylene glycol, polytetrahydrofuran, random copolymers of ethylene oxide and propylene oxide, block copolymers of ethylene oxide and propylene oxide and random copolymers of propylene oxide and tetrahydrofuran. Polyalkylene glycol and copolymers thereof are preferably used, preferably having to 10 carbon atoms in the alkylene group.

The polyether-polyester block copolymer use in the practice of the present invention is a linear polymer wherein the aforesaid two kinds of the polymer segments bond chemically, and the characteristics of the process for the preparation thereof reside in condensation polymerization of a polyester-forming monomer in the presence of a polyether.

The polyether may be added at any time so long as it occurs before completion of the polymerization, but the polyether should be added about 30 minutes before the completion of the polymerization reaction to obtain the most satisfactory copolymer. Specifically, the following methods are referred to:

(1) Adding the polyether together with a dibasic acid component and a glycol component at the outset of the polymerization.

(2) Synthesizing a bishydroxyalkyl dibasic acid ester (for example, bishydroxyethyl terephthalate) from a dibasic acid component and a glycol component in advance, mixing ester with the polyether and polymerizing the resultant mixture.

(3) Prepolymerizing a bishydroxyalkyl dibasic acid ester to prepare a polyester having a molecular weight of about 1,000–2,000, mixing this polyester with the polyether and polymerizing the resultant mixture.

In the practice of the present invention, melt polymerization is carried out under conditions similar to those for melt polymerization of an ordinary polyester. An ester interchange reaction is carried out under elevated pressure or under atmospheric pressure, followed by condensation polymerization under a highly reduced pressure. And in the present invention, even though a polyether-polyester block copolymer having a relative viscosity of at least 25 can be obtained by such melt polymerization only, solid phase polymerization, for example, in the state of chips or particles is preferably carried out for increasing the degree of polymerization.

Again, in the practice of the present invention, in order to increase the melt vixcosity of a polyether-polyester block copolymer, a compound having at least three ester-forming functional groups is sometimes added to the polyester reaction system. Such a compound is added to the polyester reaction system at any time before completion of the polymerization of the polyester.

The following examples of compounds having at least three ester-forming functional groups used in the present invention may be cited.

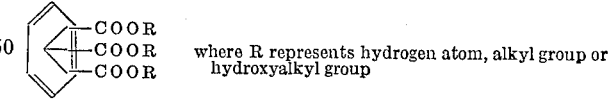

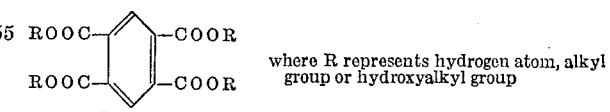

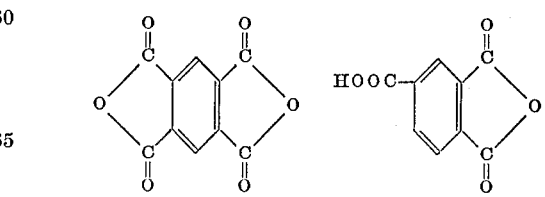

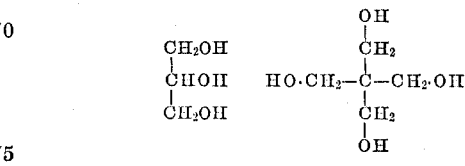

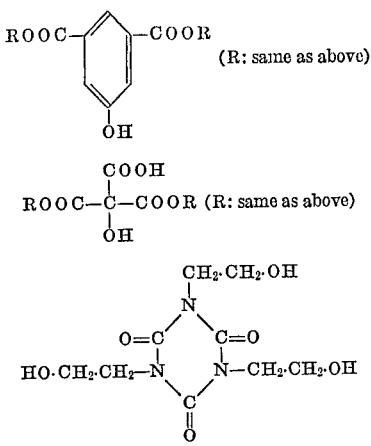

In the above examples, where R is alkyl containing about 1 to 4 carbon atoms or hydroxyalkyl containing about 2 to 10 carbon atoms.

The proper amount of addition of the compound having at least three ester-forming functional groups varies considerably according to the content of the polyalkylene ether in polymer A. However, it is normally about 0.05–20 mole percent of the dibasic acid component.

When this added amount is less than 0.05 mole percent, the viscosity does not increase to the desired relative viscosity and the effect is small, while on the other hand, when the amount added exceeds 20 mole percent a polymer of branched structure (three-dimensional network structure) is produced within a short period of polymerization time, the viscosity rises abnormally and finally the polymer gelates, assuming a condition in which it does not lend itself to shaping.

Almost all of the product according to the aforesaid method of polymerization is a polyether-polyester block copolymer, but a small amount of polyether may remain unreacted and a small amount of homopolyester may be produced.

It is apparent from the following consideration that, in case the polyether is made to exist in the condensation polymerization of a polyester-forming monomer, a block copolymer is produced by the reaction.

For example, when polyethylene glycol having a molecular weight of 20,000 and polyethylene terephthalate having a molecular weight of 1,000 are polymerized, a polymer having a molecular weight of 50,000–100,000 is obtained, which polymer is insoluble in a solvent of polyethylene glycol such as water and tetrahydrofuran. When the polyester portion of said polymer is hydrolysed by a diluted alkali, the polyether portion remains. Its molecular weight becomes roughly the same as that of the material polyethylene glycol, 19,000–20,000.

The amount of the polyether segment in the polyether-polyester block copolymer (polymer A) in the present invention is determined in connection with the amount of the polyether segment in the composition of the present invention; however, said segment is normally copolymerized within a range such that it is present in an amount of about 10.0–97.5% by weight, preferably about 30–95% by weight. When said amount is less than 10.0% by weight, in order to make the amount of the polyether segment in the final composition within the range of 0.1–10.0% by weight, the mixing ratio of the polymer A must be increased. This means appearance of the tendency to make good the compatibility of the polymer A with the polymer B and disappearance of the tendency to make the polyether segment exist in a so-called strip state as an independent phase, which is not preferable from the viewpoint of the antistatic effect.

On the other hand, in case the amount of the polyether segment in the molecular chain of the polymer A becomes larger than 97.5% by weight, operations such as polymerization and yarn spinning become very difficult because the produced polymer is very soft and low in softening point, and the dispersed state of the polymer A in the polymer B becomes undesirable, and at the same time, its washing resistance is poor because of the increased solubility of the polymer A in water.

The synthetic linear polyester to be mixed with the block copolymer used in the practice of the present invention is an aromatic polyester having repeated constitutional units at least 80% of which is represented by the general formula

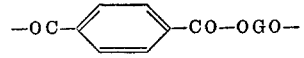

wherein G represents a group selected from the group consisting of an aliphatic hydrocarbon group and an alicyclic hydrocarbon group. As an aliphatic hydrocarbon group, an alkylene group having 2–10 carbon atoms is preferably used and as an alicyclic hydrocarbon group, there are, for example

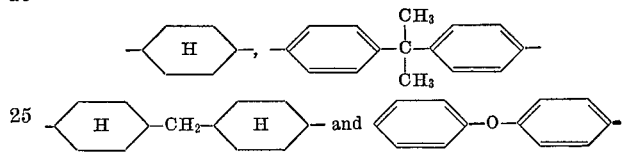

Specific examples of such synthetic linear polyesters include, for example, polyethylene terephthalate and copolymers thereof, poly-1, 4-cyclohexanediethylene terephthalate and copolymers thereof. However, a copolymer containing polyethylene terephthalate and a small amount of another component is preferably used. It is important that at least 80% of the repeating polyester constitutional unit should be terephthalate, because when the amount of said unit becomes less than 80%, the thermal properties or flexibility of the final composition is sharply reduced, which fact leads to a reduction of value when the composition of the present invention is formed into fibers, bristles, films and three-dimensional shaped articles.

In the practice of the present invention, the polyether-polyester block copolymer (polymer A) and the synthetic linear polyester (polymer B) are mixed. Normally, upon mixing and melt shaping two kinds of polymers, compatibility or dispersibility of the two polymers is considered most important. In the present invention also, this is regarded as very important for imparting good antistatic property. In the present invention, because the compatibility of the polymer A with the polymer B is relatively good, if only the dispersibility can be improved, a polymer having antistatic properties close to optimum can be obtained. In order that the polymer A be uniformly dispersed as an independent phase in the polymer B, the melt viscosity ratio of polymer A to polymer B should be within a certain range, such that the melt viscosity of the polymer A at 290° C. is 0.1–10.0 times, preferably 0.1–2.0 times that the polymer B at the same temperature. When the melt viscosity ratio is outside said range, the dispersibility of the polyether-polyester block copolymer as an independent phase is sharply decreased.

When the melt viscosity ratio is smaller than 0.1, polymer A disperses too finely in polymer B. On the other hand, when the melt viscosity ratio is greater than 10, polymer A agglomerates as lumps and does not disperse well; in each case the antistatic properties are severely reduced.

In the composition of the present invention, it is important that the polymer A should disperse uniformly as an independent phase in the polymer B. When the polymer A disperses non-uniformly as particles or lumps, the antistatic property tends to be reduced. As a factor relating to such dispersed state, the average degree of polymerization of the polyether in the block copolymer is important, which is necessarily about 100–1,000. When the average degree of polymerization is smaller than 100, the particles of the block copolymer tend to be torn to pieces and diffused in the composition, whereas when the average degree of polymerization is larger than 1,000, the particles of the block copolymer tend to become large round particles. As stated, valuable antistatic properties are lost in either case.

Polymer A and polymer B may be mixed by mixing the chips of the two polymers in a blender. However, a worm type extruder may be used for mixing and shaping the two polymers. Alternatively, the two polymers may be blended and shaped by using a shaping device equipped with a screw type mixer.

As stated, it is necessary that the composition of the present invention should contain about 0.1–10.0% by weight of the polyether. When the polyether content is less than 0.1% by weight, the effect is not sufficient, whereas in case more than 10.0% by weight of the polyether is blended, the effect hardly increases; in addition the physical properties of the shaped article are adversely affected.

In the practice of the present invention, within the stated ranges, it is possible to include proper additives in the composition, for example, a light stabilizer, a heat stabilizer, a delustrant and a pigment. It is also possible to use concurrently a surface active agent in order to improve the antistatic capacity. With the addition of the surface active agent, the block copolymer disperses in a slender fibrous state in the polyester and when the surface active agent is ionic, the ion contributes to the antistatic capability.

The following surface active agents are cited by way of examples:

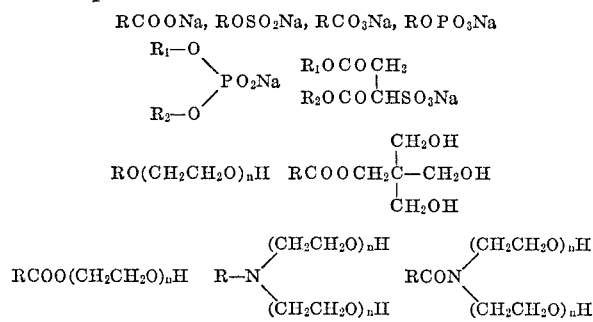

wherein R, $R_1$, $R_2$ are what is selected from the group consisting of alkyl and arylalkyl, and $n$ is an integer of at least 1.

Such an additive may be included upon synthesizing each polymer A and B or may be mixed simultaneously with mixing of the polymers A and B.

The antistatic polyester shaped articles such as fibers, bristles, films and three-dimensional shaped articles are applicable per se to the various uses of the conventional polyester fibers, bristles, films and three-dimensional shaped articles; because such shaped articles do not substantially accumulate static electricity, the disadvantages of electrostatic discharge in use are prevented. The articles are resistant to soiling because they do not absorb much dirt and dust. Since their properties are hardly affected by cleaning with ordinary detergents, a long-term antistatic effect is provided. While the composition of the present invention is useful as fibers, bristles, films and three-dimensional shaped articles, it is especially practical as fibers and films. Fibers and films are usually obtained by extruding the composition of the present invention in a molten state from a spinneret or a slit, drafting it and then subjecting it to a drawing operation. In making such shaped articles molecular orientation takes place in the direction of drafting, and such direction is sometimes called the direction of molecular orientation.

The following examples specifically explain different embodiments of the present invention. The notation "g" refers to grams and "ml" to milliliters.

EXAMPLES 1–6

A reaction flask was charged with 11 g. of polyethylene terephthalate of number average molecular weight of 1,000, 90 g. of polyethylene glycol having a molecular weight of about 20,000, 0.03 g. of antimony oxide and 0.04 g. of trimethyl phosphate and the contents were reacted with stirring under a reduced pressure of 0.1 mm. Hg for 2 hours in an oil bath at 275° C. The solution relative viscosity of the reaction product was 4.80 and the melt viscosity at 290° C. thereof was 500 poises. The amount of the ether component in the obtained copolymer was 90% by weight. The resulting polyether-polyester block copolymer was mixed with polyethylene terephthalate having a solution viscosity of 1.79 and a melt viscosity of 1,700 at 290° C. poises at various ratios as shown in Table 1, in the form of chips. The resultant mixtures were melt spun at 290° C. to obtain 50 denier 18-filament multifilament yarns. The ratios of the polyethylene ether segments in these yarns were as shown in Table 1, wherein the characteristics of the yarns obtained are concurrently shown. Comparative Examples 1–4 are also shown in the table.

TABLE 1

| | Mixing ratio | | Polyether ratio in the fiber (wt. percent) | Specific resistance (Ω cm.) | Tensile characteristics | | |
|---|---|---|---|---|---|---|---|
| | Copolymer (wt. percent) | Polyester (wt. percent) | | | Tenacity (g./d.) | Elongation (percent) | Modulus (g./d.) |
| Comparative Example: | | | | | | | |
| 1 | 0 | 100 | 0 | 2.4×10¹⁴ | 4.55 | 31.8 | 85.2 |
| 2 | 0.022 | 99.978 | 0.02 | 205×10⁸ | 4.62 | 34.3 | 85.6 |
| 3 | 0.055 | 99.945 | 0.05 | 64×10⁸ | 4.61 | 34.0 | 84.1 |
| Example: | | | | | | | |
| 1 | 0.11 | 99.89 | 0.1 | 17.0×10⁸ | 4.65 | 28.3 | 83.2 |
| 2 | 0.33 | 99.67 | 0.3 | 8.4×10⁸ | 4.42 | 29.6 | 82.1 |
| 3 | 1.1 | 98.9 | 1.0 | 2.7×10⁸ | 4.44 | 28.4 | 80.6 |
| 4 | 2.2 | 97.8 | 2.0 | 1.4×10⁸ | 4.40 | 29.7 | 81.2 |
| 5 | 5.5 | 94.5 | 5.0 | 0.56×10⁸ | 4.32 | 30.4 | 80.3 |
| Comparative Example: | | | | | | | |
| 4 | 11.1 | 88.9 | 10.0 | 0.31×10⁸ | 4.02 | 26.3 | 78.1 |
| 5 | 13.2 | 86.8 | 12.0 | 0.26×10⁸ | 3.35 | 19.2 | 66.0 |
| 6 | 16.6 | 83.4 | 15.0 | ---------- | (¹) | (¹) | (¹) |

¹ Non-spinnable.

From the results of Table 1, it is apparent that when the ratio of the polyethylene ether component contained in the fiber is at least 0.1, the fiber has a very excellent antistatic effect and when the content of the polyethylene ether component exceeds 10% by weight, the mechanical properties such as tenacity and elongation decrease. The relative solution viscosity measured in these examples and the following examples was measured at 25° C. with reference to a solution wherein 1 g. of the polymer was dissolved in 100 ml. of O-chlorophenol.

And the resistivity (specific resistance) of the yarn was a value measured in this example and the following examples as follows:

Filaments to be measured are put into a 0.2 wt. percent aqueous solution of a commercially available anionic, weakly alkaline detergent, and washed with an electric washer for 2 hours. After washing with water and drying, the electric resistance R (ohms) of a filament having a length of 10 cm. and a size of 1,000 denier is measured by using a super insulation meter at a direct current voltage of 100 volts at 25° C., in the atmosphere having a relative humidity of 40%. The specific resistance (ohms/cm.) is calculated from R in accordance with the following equation.

$$\delta \text{ (specific resistance)} = \frac{R \times D}{\delta \times L \times d} \times 10^{-5}$$

D: a total denier of a specimen
L: a length (cm.) of a specimen
d: a density (g./cm.$^3$) of a specimen

EXAMPLES 6–15

In the same manner as in the aforesaid examples, by varying the amount of polyethylene terephthalate, polyetherpolyester block copolymers whose contents of the polyethylene ether components were 7–99% were synthesized.

These block copolymers were, in the same manner as in Example 1, mixed with polyethylene terephthalate having a solution relative viscosity (1% in O-chlorophenol) of 1.79 and a melt viscosity of 1,700 poises, the mixtures being spun to obtain multifilament yarns (50 denier, 18 filaments) each containing 2% by weight of the polyethylene ether component. The characteristics of the block copolymers and the characteristics of the multifilament yarns were shown in Table 2, wherein Comparative Examples 7–10 were also shown.

TABLE 2

| | Polyethylene ether content in the block copolymer (weight percent) | Block copolymer | | Specific resistance (ohm cm.) | Tensile characteristics | | |
|---|---|---|---|---|---|---|---|
| | | $\eta_r$ ocp. 1%, 25° C. | Melt viscosity (poise) | | Tenacity (g./d.) | Elongation (percent) | Modulus (g./d.) |
| Comparative Example: | | | | | | | |
| 7 | 7 | 2.31 | 1,800 | 180×10⁸ | 4.85 | 27.1 | 81.1 |
| 8 | 9 | 2.33 | 1,650 | 120×10⁸ | 4.92 | 28.9 | 80.0 |
| Example: | | | | | | | |
| 6 | 10 | 2.44 | 1,430 | 70×10⁸ | 4.86 | 27.2 | 78.6 |
| 7 | 15 | 2.50 | 1,260 | 62×10⁸ | 4.73 | 26.5 | 81.4 |
| 8 | 20 | 2.55 | 1,150 | 60×10⁸ | 4.44 | 24.2 | 82.6 |
| 9 | 30 | 2.68 | 1,100 | 58×10⁸ | 4.52 | 28.6 | 81.0 |
| 10 | | | | | | | |
| 11 | 50 | 2.99 | 1,080 | 56×10⁸ | 4.71 | 22.0 | 86.2 |
| 12 | 85 | 4.36 | 720 | 3.2×10⁸ | 4.36 | 23.5 | 84.1 |
| 13 | 90 | 4.80 | 500 | 1.3×10⁸ | 4.55 | 26.7 | 82.1 |
| 14 | 95 | 4.51 | 450 | 4.1×10⁸ | 4.72 | 27.2 | 81.4 |
| 15 | 97.5 | 3.85 | 270 | 6.2×10⁸ | 4.64 | 28.4 | 86.2 |
| Comparative Example: | | | | | | | |
| 9 | 98 | 3.16 | 80 | 76×10⁸ | 4.15 | 30.5 | 80.4 |
| 10 | 99 | 2.43 | 60 | 667×10⁸ | 4.11 | 31.2 | 79.6 |

From the results of Table 2, it is apparent that in case the polyether composition contents in the block copolymers are 10–97.5% by weight, both the solution viscosities and the melt viscosities are sufficiently high, and as a result the antistatic effects are remarkable. In case the polyether content is less than 10% by weight, the solution viscosity lowers and in case the polyether content exceeds 97.5% by weight, both the solution viscosity and the melt viscosity lower, and therefore in both cases the antistatic effects become inferior.

An electron microscopic photograph of filaments obtained by using said polyether-polyester block copolymer containing 90% by weight of the polyether segment (Example 13) is shown in FIG. 1. As will be apparent from FIG. 1, the polyether-polyester block copolymer uniformly disperses in the state of stripes or bands as an independent phase in the fiber.

EXAMPLES 16–22

In the same manner as in Examples 1–15, several kinds of polyether-polyester block copolymers, each containing 90% by weight of polyethylene ether, were synthesized by varying the molecular weight of polyethylene glycol from 1,000 to about 50,000.

These copolymers were mixed in the state of chips with polyethylene terephthalate having a solution viscosity of 1.79 and a melt viscosity at 290° C. of 1,700 poises, and the mixtures were melt spun to obtain multifilament yarns (50 denier, 18 filaments) each containing 1.5% by weight of polyethylene ether.

The characteristics of the polyether-polyester block copolymers and the yarn qualities of the resulting yarns are shown in Table 3, wherein examples of uses of poly-

TABLE 3

| | Average molecular weight of polyethylene glycol in the block copolymer | Degree of polymerization of polyethylene glycol | Block copolymer | | Specific resistance (ohm cm.) | Tensile characteristics | | | Length diameter of the cross-section |
|---|---|---|---|---|---|---|---|---|---|
| | | | $\eta_r$ | Melt viscosity (poise) | | Tenacity (g./d.) | Elongation (percent) | Modulus (g./d.) | |
| Comparative Example: | | | | | | | | | |
| 11 | 880 | 20 | 1.79 | 65 | 420×10⁸ | 4.72 | 27.0 | 88.0 | <10 |
| 12 | 1,540 | 35 | 2.96 | 84 | 122×10⁸ | 4.86 | 26.6 | 84.2 | <10 |
| Example: | | | | | | | | | |
| 16 | 3,600 | 93 | 3.32 | 360 | 9.8×10⁸ | 4.15 | 25.5 | 83.6 | >50 |
| 17 | 8,800 | 200 | 4.11 | 420 | 5.2×10⁸ | 4.51 | 28.3 | 81.2 | >100 |
| 18 | 11,000 | 250 | 4.26 | 440 | 2.4×10⁸ | 4.44 | 26.8 | 83.2 | >100 |
| 19 | 16,000 | 360 | 4.36 | 490 | 1.8×10⁸ | 4.73 | 30.2 | 83.2 | >500 |
| 20 | 22,000 | 500 | 4.83 | 520 | 2.1×10⁸ | 4.51 | 28.6 | 86.2 | >500 |
| 21 | 35,000 | 870 | 5.11 | 670 | 7.2×10⁸ | 4.32 | 29.6 | 80.1 | >50 |
| 22 | 44,000 | 1,000 | 5.72 | 720 | 12.1×10⁸ | 4.16 | 28.1 | 79.6 | >10 |
| Comparative Example 13 | 52,000 | 1,200 | 6.33 | 860 | 134×10⁸ | 3.61 | 28.4 | 647 | <10 |

NOTE.—In Table 3, the last column stands for the ratio of the axial length of the stripe of the polyether-polyester block copolymer to the diameter of the cross-section thereof (axial length/diameter).

ethylene glycol of too low degrees of polymerization are shown as Comparative Examples 11 and 12 and an example of use of polyethylene glycol of an excessive degree of polymerization is shown as Comparative Example 13.

EXAMPLES 23–24

Chips of 60 g. of the polyether-polyester block copolymer obtained in Example 1 were immersed in a solution obtained by dissolving 20 g. of dodecylbenzene sodium sulfonate in 100 ml. of water. After almost all of the solution was absorbed, the chips were dried by a reduced pressure dryer under a pressure of below 1 mm. Hg at 70–80° C. to obtain a polyether-polyester block copolymer containing 25% by weight of dodecylbenzene sodium sulfonate. This block copolymer was, in the same manner as in Example 1, mix spun with polyethylene terephthalate having a solution relative viscosity of 1.79 and a melt viscosity at 290° C. of 1,700 posies to obtain a multifilament yarn containing 2% of the polyether component and 0.74% of dodecylbenzene sodium sulfonate.

The physical properties of the yarn obtained are shown in Table 4 (Example 23) wherein the physical properties of a yarn obtained by not adding dodecylbenzene sodium sulfonate (DBS) are also shown for reference (Example 24).

After repeating ordinary washing 10 times, the antistatic capacity specific resistance of this sample hardly changed at all.

TABLE 4

| | Specific resistance (ohm cm.) | Tensile characteristics | | |
|---|---|---|---|---|
| | | Tenacity (g./d.) | Elongation (percent) | Modulus (g./d.) |
| Example: | | | | |
| 23 | $0.26 \times 10^8$ | 4.46 | 27.0 | 82.1 |
| 24 | $1.4 \times 10^8$ | 4.40 | 29.7 | 81.2 |

EXAMPLE 25

A reaction vessel was charged with 13.3 g. of bis-hydroxyethyl terephthalate, 90 g. of an ethylene oxide-propylene oxide (3:1 by weight) random copolymer, 0.03 g. of antimony oxide and 0.04 g. of trimethyl phosphate, and the contents were reacted with stirring under a reduced pressure of 0.1 mm. Hg in an oil bath at 275° C. for 2 hours. The solution relative viscosity of the reaction product was 4.31 and the melt viscosity at 290° C. thereof was 445 poises. The amount of polyether contained in the reaction product was 90%.

The resulting polyether-polyester block copolymer was mixed in the form of chips with polyethylene terephthalate having a solution viscosity of 1.79 and a melt viscosity at 290° C. of 1,700 poises, the mixture being melt spun to obtain a 50 denier, 18 filament multifilament yarn containing 1% of polyether. The characteristics of the resulting yarn were as follows:

Specific resistance of the yarn: $3.1 \times 10^8$ ohm cm.
Tensile strength: 4.64 g./d.
Modulus: 83.6 g./d.
Elongation: 29.2%

EXAMPLE 26

A polyether-polyester block copolymer having a solution relative viscosity of 4.80 and a melt viscosity at 290° C. of 1,100 poises obtained as in Example 1, was mixed in the form of chips with polyethylene, the polyester consisting of 90 wt. percent of ethylene trephthalate and 10 wt. percent of ethylene isophthalate having a melt viscosity at 290° C. of 1,200 poises, the mixture being melt spun to obtain a 50 denier, 18 filament multifilament yarn containing 2% by weight of polyethylene ether.

The characteristics of the yarn obtained were as follows:

Specific resistance of the yarn: $1.1 \times 10^8$ ohm cm.
Tenacity: 4.38 g./d.
Elongation: 35.3%
Modulus: 72.4 g./d.

EXAMPLES 27–31

As shown in Table 5, polyether-polyethylene terephthalate block copolymers having various melt viscosities (the polyethylene glycol contents in the block copolymers being 90%) were prepared, and they were mixed in the form of chips with polyethylene terephthalate, the mixtures being melt spun to obtain multifilament yarns containing 1% of polyethylene glycol.

The characteristics of the yarns are shown in Table 5.

TABLE 5

| | Melt viscosity (290 C. poise) | | Melt viscosity ratio (A/B) | Specific resistance (ohm. cm.) |
|---|---|---|---|---|
| | Block copolymer (A) | Polyethylene terephthalate (B) | | |
| Comparative Example: | | | | |
| 14 | 60 | 1,700 | 0.035 | $112 \times 10^8$ |
| Example: | | | | |
| 27 | 180 | 1,700 | 1.06 | $9.2 \times 10^8$ |
| 28 | 500 | 1,700 | 0.29 | $2.6 \times 10^8$ |
| 29 | 1,080 | 1,700 | 0.63 | $2.1 \times 10^8$ |
| 30 | 1,080 | 1,050 | 1.03 | $8.4 \times 10^8$ |
| 31 | 1,080 | 800 | 1.35 | $12.0 \times 10^8$ |

EXAMPLES 32–36

Bis (β-hydroxyethyl) terephthalate obtained by an ester interchange reaction of dimethyl terephthalate with ethylene glycol (containing some amount of an oligomer) was mixed with polyethylene glycol having a numerical average molecular weight of about 4150, to the resulting mixture 0.03% by weight of antimony trioxide was added as a polymerization catalyst and the resultant mixture was polycondensed at 270° C. under 0.1 mm. Hg for 3 hours. The content of polyethylene glycol in the total weight of the resulting block copolymer was about 50% by weight.

The chips were obtained from this block copolymer and were subjected to further polymerization in the solid phase at 220° C. under 0.1 mm. Hg. By varying the period of polymerization, several samples of different relative viscosity were obtained. It took about 9 hours to obtain a block copolymer of 3.10 of relative viscosity.

Each of such block copolymers in the form of chips was mixed with polyethylene terephthalate at a ratio of 1:24 and each of the obtained mixtures was melt spun at 285° C. The characteristics of the yarns obtained together with those of Comparative Example 15 are shown in Table 6. In Example 36 the block copolymer of relative viscosity 2.55 was obtained solely by melt polymerization for a prolonged period without a solid polymerization. Comparative Example 15 was a case of polyethylene terephthalate only.

TABLE 6

| | Relative viscosity of the block copolymer ($\eta_r$) | Voltage charged by friction (v.) | Tensile characteristics | | |
|---|---|---|---|---|---|
| | | | Tenacity (g./d.) | Elongation (percent) | Modulus (g./d.) |
| Example: | | | | | |
| 32 | 2.55 | 1,350 | 4.5 | 26 | 84 |
| 33 | 2.70 | 1,200 | 4.6 | 26 | 86 |
| 34 | 2.90 | 1,050 | 4.7 | 27 | 86 |
| 35 | 3.10 | 1,100 | 4.6 | 27 | 87 |
| 36 | 2.55 | 1,600 | 4.2 | 25 | 82 |
| Comparative Example 15 | | 4,700 | 4.7 | 28 | 90 |

NOTE.—Method of measuring electrostatic voltage generated by friction.

A knit fabric was made by using a sample, which was degreased with a mixed solvent of alcohol and benzene and then rubbed with nylon taffeta and the generated voltage was measured by a rotary static tester. The temperature was 20° C. and the relative humidity was 40%.

EXAMPLES 37-42

Using polyethylene glycol having a numerical average molecular weight of about 8,200 in the same manner as in Example 32, a block copolymer was obtained. The ratio of polyether in this copolymer was 40% by weight and the relative viscosity of said copolymer of 2.35 was increased to 2.95 by polymerization in a solid phase in the same manner as in Example 32.

This block copolymer was mixed with polyethylene terephthalate at various ratios, the resulting mixtures were melt spun to obtain yarns the ratios of whose polyether segments were as shown in Table 7, wherein the results of Comparative Examples 16, 17 and 18 are concurrently shown. From the results of Table 7, it is understood that as the ratio of the polyether segment increased (Comparative Example 18), the tenacity and the modulus lowered.

TABLE 7

| | Amount of polyether in the yarn (weight percent) | Voltage charged by friction (v.) | Tensile characteristics | | |
|---|---|---|---|---|---|
| | | | Tenacity (g./d.) | Elongation (percent) | Modulus (g./d.) |
| Comparative Example: | | | | | |
| 16 | 0 | 4,900 | 4.6 | 28 | 90 |
| 17 | 0.05 | 4,400 | 4.7 | 27 | 89 |
| Example: | | | | | |
| 37 | 0.1 | 3,200 | 4.6 | 27 | 87 |
| 38 | 0.3 | 2,200 | 4.6 | 26 | 87 |
| 39 | 1.0 | 1,400 | 4.6 | 27 | 84 |
| 40 | 3.0 | 900 | 4.5 | 25 | 83 |
| 41 | 5.0 | 700 | 4.3 | 23 | 78 |
| 42 | 10.0 | 550 | 4.1 | 20 | 70 |
| Comparative Example 18 | 15.0 | 600 | 3.6 | 18 | 63 |

EXAMPLES 43-47

A reaction vessel was charged with 13.3 g. of bishydroxyethyl terephthalate, 100 g. of polyethylene glycol having a molecular weight of about 20,000, 0.04 g. of antimony oxide, 0.08 g. of trimethyl phosphate and various amounts (0-25 mole percent based on bishydroxyethyl terephthalate) of 1,2,4-tri (hydroxyethyl) trimellitic acid ester

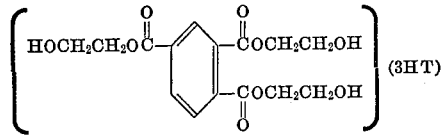 (3HT)

the contents were reacted with stirring under a reduced pressure of below 0.1 mm. Hg in an oil bath at 275° C. 1-2 hours.

Each of the resulting various polyether-polyester block copolymers (polymers A) was mixed in the form of chips with polyethylene terephthalate having a solution viscosity (at 290° C.) of 1,700 poises (polymer B), and was melt spun to obtain multifilament yarns containing 1.5% by weight of polyethylene ether.

The characteristics of the resulting yarns together with the characteristics of the block copolymers are shown in Table 8, wherein the results of Comparative Examples 17 and 18 are also shown.

TABLE 8

| | Polyether-polyester block copolymer | | | | Tensile characteristics | | | |
|---|---|---|---|---|---|---|---|---|
| | Adding amount [1] | $\eta_r$ | Melt viscosity (poise) | Specific resistance (ohm cm.) | Tenacity (g./d.) | Elongation (percent) | Modulus (g./d.) | Melt viscosity [2] |
| Comparative Example 19 | 0 | 2.90 | 175 | 116×10⁸ | 4.66 | 28.4 | 88.0 | 0.1 |
| Example: | | | | | | | | |
| 43 | 0.5 | 3.45 | 1,950 | 6.3×10⁸ | 4.71 | 29.2 | 86.4 | 1.1 |
| 44 | 1 | 4.94 | 3,200 | 2.3×10⁸ | 4.56 | 30.3 | 87.1 | 1.9 |
| 45 | 3 | 5.64 | 4,400 | 1.2×10⁸ | 4.74 | 28.6 | 80.6 | 2.6 |
| 46 | 10 | 7.25 | 6,500 | 1.1×10⁸ | 4.61 | 27.3 | 81.3 | 3.8 |
| 47 | 20 | 8.11 | 10,200 | 11.1×10⁸ | 4.05 | 25.2 | 69.6 | 6.0 |
| Comparative Example 20 | 25 | [3] | [4] | [5] | [5] | [5] | [5] | >10 |

[1] Adding amount of 1, 2, 4-tri (hydroxyethyl) trimellitic acid ester to bishydroxyethyl terephthalate (mole percent).
[2] Ratio block polymer/polyethylene terephthalate.
[3] Insoluble.
[4] Non-measurable.
[5] Non-spinnable.

As will be understood from the results of Table 8, when the amount of addition of 1,2,4-(hydroxyethyl) trimellitic acid ester was more than 20% based on bishydroxyethyl terephthalate, the polyether-polyester block copolymer per se was not infusable and non-spinnable.

EXAMPLE 48

A reaction vessel was charged with 9.9 g. of bishydroxyethyl terephthalate, 90 g. of polyethylene glycol having a molecular weight of about 20,000, 1.1 g. of 1,2,4,5-tetra (hydroxyethyl) pyromellitic acid ester

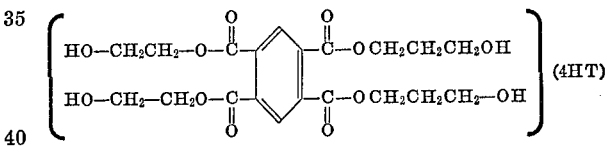 (4HT)

0.03 g. of antimony oxide and 0.04 g. of trimethyl phosphate, the contents were reacted with stirring under a reduced pressure of below 0.1 mm. Hg over 275° C. for 90 minutes. The resulting polyether-polyester block copolymer had a solution relative viscosity of 9.11 and a melt viscosity at 290° C. of 1,300 poises.

The resulting polyether-polyester block copolymer was mixed in the form of chips with polyethylene terephthalate having a solution relative viscosity of 1.79 and a melt viscosity at 290° C. of 1,700 poises, the mixture being melt spun to obtain a multifilament yarn containing 2% of the polyethylene ether component.

The characteristics of the yarn were as follows:

Specific resistance: 0.9×10⁸ ohm cm.
Tensile tenacity: 4.7 g./d.
Elongation: 26%
Modulus: 81.4%

EXAMPLES 49-57

A reaction vessel was charged with 27 g. of bishydroxyethyl terephthalate, 70 g. of various kinds of polyethylene glycols having molecular weights of from about 400 to about 100,000, 3 g. of pyromellitic anhydride

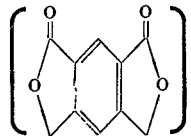

0.03 g. of antimony oxide and 0.04 g. of trimethyl phosphate, the contents being reacted with stirring under a reduced pressure of below 0.1 mm. Hg in an oil bath at 275° C. for 2 hours.

Each of the resulting polyether-polyester block copolymers was mixed in the form of chips with polyethylene terephthalate having a solution relative viscosity of 1.79 and a melt viscosity at 290° C. of 1,700 poises to obtain multifilament yarns containing 1% of polyethylene ether.

The characteristics of the polyether-polyester block copolymers and of the resulting yarns are shown in Table 9, wherein the results of Comparative Examples 21–23 are also shown.

TABLE 9

| | Block polymer | | | Tensile characteristics | | |
|---|---|---|---|---|---|---|
| | Molecular weight of PEG[1] | $\eta_r$ | Melt viscosity (poise) | Specific resistance (ohm cm) | Tenacity (g./d.) | Elongation percent | Modulus (g./d.) |
| Comparative Example: | | | | | | | |
| 21 | 400 | 3.36 | 3,400 | 36×10⁸ | 4.66 | 27.0 | 81.1 |
| 22 | 880 | 3.52 | 3,600 | 17.1×10⁸ | 4.53 | 30.1 | 83.3 |
| Example: | | | | | | | |
| 49 | 1,750 | 3.63 | 3,800 | 7.9×10⁸ | 4.61 | 28.6 | 81.6 |
| 50 | 3,600 | 3.72 | 3,900 | 5.9×10⁸ | 4.44 | 27.3 | 80.6 |
| 51 | 4,500 | 3.86 | 4,010 | 3.9×10⁸ | 4.55 | 26.1 | 81.2 |
| 52 | 8,800 | 4.14 | 4,200 | 2.3×10⁸ | 4.05 | 26.4 | 82.0 |
| 53 | 16,000 | 4.73 | 4,600 | 2.2×10⁸ | 4.31 | 26.6 | 83.2 |
| 54 | 22,000 | 4.81 | 4,680 | 4.5×10⁸ | 4.26 | 25.1 | 80.5 |
| 55 | 26,000 | 4.92 | 4,800 | 6.1×10⁸ | 4.34 | 28.3 | 81.6 |
| 56 | 35,000 | 4.96 | 4,900 | 8.3×10⁸ | 4.66 | 27.6 | 84.2 |
| 57 | 45,000 | 5.55 | 5,000 | 12.1×10⁸ | 4.11 | 25.2 | 80.6 |
| Comparative Example: | | | | | | | |
| 23 | 100,000 | 8.64 | 6,200 | 132×10⁸ | 3.88 | 20.6 | 76.3 |

[1] In a polyetherpolyester block copolymer.

EXAMPLES 58–59

A reaction vessel was charged with 9.9 g. of bis-hydroxyethyl terephthalate, 90 g. of an ethylene oxide-propylene oxide (weight ratio 3:1) random copolymer, 1.1 g. of 1,2,4,5-tetrahydroxyethyl pyromellitic acid ester, 0.03 g. of antimony oxide and 0.04 g. of trimethyl phosphate, the contents being reacted in an oil bath at 275° C. under a reduced pressure of 0.1 mm. Hg for 2 hours to obtain a polyether-polyester block copolymer. This block copolymer had a relative viscosity of 8.64 and a melt viscosity at 290° C. of 1,250 poises.

Chips of 70 g. of the obtained block copolymer were immersed in 200 ml. of an aqueous solution of 25 g. of dodecylbenzene sodium sulfonate and after almost all the solution was absorbed, the chips were dried by a reduced pressure dryer at 70–80° C. under a pressure of below 1 mm. Hg.

The resulting block copolymer containing 25% of dodecylbenzene sodium sulfonate was well mixed in the form of chips with ordinary polyethylene terephthalate having a solution viscosity of 1.79 and a melt viscosity at 290° C. of 1,700 poises, the mixture being melt spun to obtain a multifilament yarn containing 2% by weight of polyether and 0.74% by weight of dodecylbenzene sodium sulfonate.

The physical properties of the resulting yarn are shown in Table 10, wherein the results of spinning the block copolymer not containing dodecylbenzene sodium sulfonate (DBS) under the same conditions (the polyether content in the yarn being 2%) are also shown.

TABLE 10

| | Specific resistance (ohm cm.) | Tensile characteristics | | |
|---|---|---|---|---|
| | | Tenacity (g./d.) | Elongation (percent) | Modulus (g./d.) |
| Example: | | | | |
| 58 | 0.36×10⁸ | 4.67 | 28.1 | 87.6 |
| 59 | 1.0×10⁸ | 4.65 | 29.6 | 88.4 |

Values of the resistivity of these samples hardly changed after being washed 10 times.

EXAMPLES 60–67

Under the same conditions as those in Example 48, by varying the amount of added bishydroxyethyl terephthalate, block copolymers containing 5–98% of the polyethylene ether component were obtained. Each of these block copolymers was mixed in the form of chips with polyethylene terephthalate having a relative viscosity of 1.79, each of the mixtures being melt spun to obtain multifilament yarns each containing 1% by weight of the polyethylene ether component.

The characteristics of the block copolymers and of the yarns are shown in Table 11, wherein the results of Comparative Examples 24 and 25 are also shown.

TABLE 11

| | Block polymer | | | Specific resistance (ohm cm.) | Tensile characteristics | | |
|---|---|---|---|---|---|---|---|
| | Content of polyethylene[1] | $\eta_r$ | Melt viscosity (poise) | | Tenacity (g./d.) | Elongation (percent) | Modulus (g./d.) |
| Comparative Example 24 | 5 | 2.21 | 3,600 | 145.1×10⁸ | 4.84 | 28.5 | 88.1 |
| Example: | | | | | | | |
| 60 | 10 | 3.26 | 3,800 | 12.0×10⁸ | 4.76 | 28.3 | 84.3 |
| 61 | 30 | 4.73 | 4,200 | 8.4×10⁸ | 4.68 | 27.9 | 82.6 |
| 62 | 50 | 4.94 | 4,350 | 6.3×10⁸ | 4.55 | 26.8 | 87.5 |
| 63 | 75 | 5.88 | 4,800 | 4.5×10⁸ | 4.43 | 27.2 | 84.1 |
| 64 | 93.5 | 5.96 | 4,650 | 5.0×10⁸ | 4.72 | 26.6 | 83.1 |
| 65 | 95 | 4.86 | 4,350 | 7.2×10⁸ | 4.68 | 27.3 | 82.1 |
| 66 | 96 | 4.55 | 3,650 | 9.6×10⁸ | 4.43 | 25.2 | 83.1 |
| 67 | 97.5 | 4.61 | 3,100 | 24.0×10⁸ | 4.14 | 23.1 | 77.0 |
| Comparative Example 25 | 98 | 3.55 | 2,700 | 286×10⁹ | 3.66 | 21.5 | 74.3 |

[1] In the block polymer percent.

EXAMPLES 68–72

The block copolymer used in Example 48 was blend spun with polyethylene terephthalate at various ratios to obtain multifilament yarns containing 0.05–12% of polyethylene glycol components as shown in Table 12. The yarn qualities are shown in Table 12, wherein the results of Comparative Examples 26 and 27 are also shown.

TABLE 12

| | Polyether content in the yarn (weight percent) | Specific resistance (ohm cm.) | Tenacity (g./d.) |
|---|---|---|---|
| Comparative Example 26 | 0.05 | 140×10$^8$ | 4.6 |
| Example: | | | |
| 68 | 0.10 | 17×10$^8$ | 4.4 |
| 69 | 1.0 | 1.9×10$^8$ | 4.5 |
| 70 | 2.0 | 0.9×10$^8$ | 4.6 |
| 71 | 5.0 | 0.7×10$^8$ | 4.3 |
| 72 | 10.0 | 0.6×10$^8$ | 3.9 |
| Comparative Example 27 | 12.0 | 1.2×10$^8$ | 3.2 |

When the content of polyethylene glycol component is smaller than 0.1%, no completely satisfactory antistatic effect could be obtained. On the contrary, in case said content is more than 10%, the mechanical properties of the yarn remarkably deteriorate.

EXAMPLE 73

The polyether-polyester block copolymer obtained in Example 48 was blended in the form of chips and melt spun with polyester containing 90 weight percent of ethylene terephthalate and 10 weight percent of ethylene isophthalate to obtain a multifilament yarn containing 1% of a polyethylene glycol component. The yarn qualities were as follows:

Specific resistance: 1.2×10$^8$ ohm cm.
Tenacity: 4.2 g./d.
Elongation: 32%

Where in the specification and claims reference is made to an aliphatic or alicyclic hydrocarbon group each having 2-15 carbon atoms, it is appreciated that an alicyclic hydrocarbon group normally must have at least about 4 carbon atoms, and that the foregoing expression has been used for the sake of simplicity and brevity.

The following is claimed:

1. A polyester composition ideally adapted for shaping and having excellent antistatic properties which is a mixture of
    (a) a polyether-polyester block copolymer consisting of a synthetic linear polyether segment and a synthetic linear polyester segment, wherein said polyether segment has the formula $$-(RO)_n-$$

(wherein R stands for one or more divalent alkylene groups having 2-10 carbon atoms and $n$ represents an integer of 100-1000), and the weight ratio of said segment is 10.0-97.5% by weight of said polyether-polyester block copolymer the relative viscosity of said polyether-polyester block copolymer being at least 2.5, with
    (b) a synthetic linear polyester having a repeating constitutional unit, at least 89% of the total of the repeating units in the polyester high molecular chain being represened by the formula $$-OC-\bigcirc-CO-OGO-$$

wherein G is selected from the group consisting of an aliphatic hydrocarbon group and an alicyclic hydrocarbon group each having about 2-15 carbon atoms, said polyether segment being contained in said mixture in an amount of 0.1-10.0% by weight based on the total weight of said mixture.

2. The polyester composition described in claim 1 wherein the amount of said synthetic linear polyether segment constituting said polyether-polyester block copolymer is 30.0-95.0% by weight of said polyether-polyester block copolymer.

3. The polyester composition described in claim 1 wherein the amount of said polyether segment is 0.3-5.0% by weight based on the total weight of said composition.

4. The polyester composition described in claim 1 wherein said polyether is a polyalkylene ether.

5. The polyester composition described in claim 4 wherein said polyalkylene ether is polyethylene glycol.

6. The polyester composition described in claim 4 wherein said polyalkylene ether is a copolymer of ethylene oxide and propylene oxide.

7. The polyester composition described in claim 1 wherein said polyether-polyester block copolymer is dispersed as an independent phase of slender fibrous particles in said synthetic linear polyester.

8. The polyester composition described in claim 1 wherein the melt viscosity at 290° C. of said polyether-polyester block copolymer is 0.1-10.0 times that at the same temperature of said synthetic linear polyester.

9. The polyester composition described in claim 1 wherein a small amount of a surface active agent selected from the group consisting of the formula of $$RCOONa, ROSO_2Na, RCO_3Na, ROPO_3Na, \begin{matrix} R_1-O \\ R_2-O \end{matrix}\!\!>\!\!PO_2Na$$

$$\begin{matrix} R_1OCOCH_2 \\ R_2OCOCHSO_3Na, \end{matrix} \quad RO(CH_2CH_2O)_nH, \quad RCOOCH_2\underset{\underset{CH_2OH}{|}}{\overset{\overset{CH_2OH}{|}}{C}}-CH_2OH$$

$$RCOO(CH_2CH_2O)_nH, \quad R-N\!\!<\!\!\begin{matrix}(CH_2CH_2O)_nH \\ (CH_2CH_2O)_nH\end{matrix}$$

$$\text{and } RCON\!\!<\!\!\begin{matrix}(CH_2CH_2O)_nH \\ (CH_2CH_2O)_nH\end{matrix}$$

wherein R, R$_1$ and R$_2$ are selected from the groups consisting of alkyl and arylalkyl, respectively, and $n$ is an integer of at least 1, is also included in the composition.

10. A process for the preparation of a polyester composition which comprises (i) condensation polymerizing a polyester-forming dibasic acid, at least 80% of which is terephthalic acid with an alkylene glycol having 2-10 carbon atoms, characterized by adding a polyalkylene ether having a degree of polymerization of 100-1000 so that the amount thereof becomes 10-97.5% by weight based on the total amount of the final poly-condensate before completion of said polymerization to produce a polyether-polyester block copolymer, and (ii) melt mixing the so obtained polyether-polyester block copolymer, having a relative viscosity of at least 2.5, with a synthetic linear polyester having a repeating constitutional unit, at least 80% of the total number of the repeating constitutional unit in the polyester high molecular chain is represented by the general formula $$-OC-\bigcirc-CO-OGO-$$

wherein G is selected from the group consisting of an aliphatic hydrocarbon group and an alicyclic hydrocarbon group each having about 2-15 carbon atoms.

11. The process for the preparation described in claim 10 wherein a polyether-polyester block copolymer having a melt viscosity which is 0.1-10 times that at 290° C. of said synthetic linear polyester is used.

12. The process described in claim 10 wherein said polyester-forming dibasic acid, 0.3-20.0 mole percent of a compound having at least three ester-forming functional groups based on said dibasic acid is added to the polymerization system for producing said polyether-polyester block copolymer.

13. The process described in claim 12 wherein said compound is selected from the groups consisting of $$\bigcirc\!\!\begin{matrix}-COOR \\ -COOR \\ -COOR\end{matrix}$$

where R represents hydrogen atom, alkyl group or hydroxyalkyl group

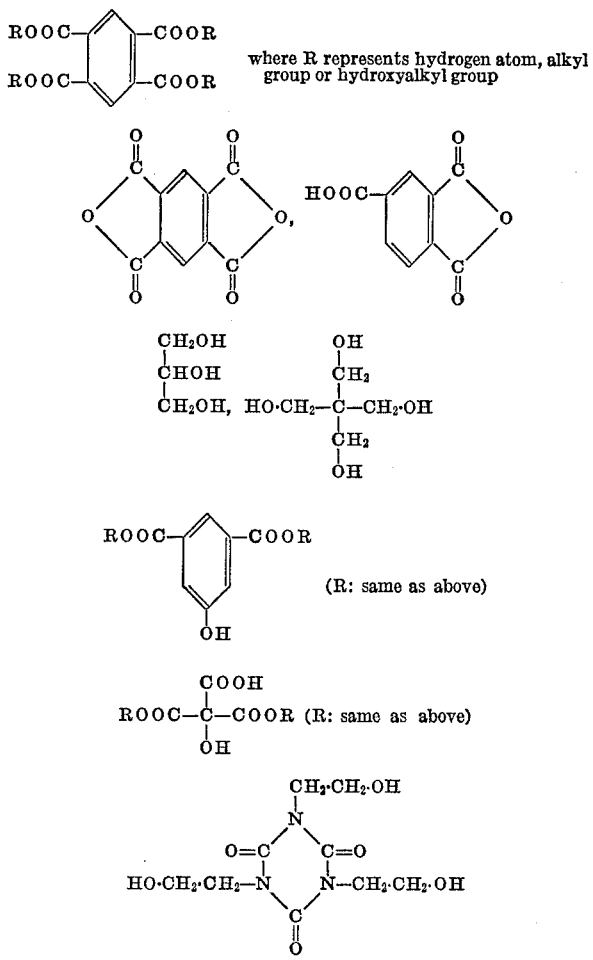

where R is alkyl containing about 1 to 4 carbon atoms or hydroxyalkyl containing about 2 to 10 carbon atoms.

14. The process described in claim 10 wherein said polyether-polyester block copolymer is so melt mixed with said synthetic linear polyester that the amount of the polyether segment becomes 0.1–10.0% by weight based on the total weight of the final composition.

15. The process for the preparation described in claim 10 wherein as said polyalkylene ether, polyethylene glycol is used.

16. A process for the preparation of a polyester composition for shaping advanced in antistatic property which comprises (i) condensation polymerizing a dibasic acid for forming a polyester, at least 80% of which is terephthalic acid with a low molecular alkylene glycol having 2–10 carbon atoms, characterized by adding a polyalkylene ether having a degree of polymerization of 100–1000 so that the amount thereof becomes 10–97.5% by weight based on the total amount of the final polycondensate before completion of said polymerization to complete the polycondensation and produce a polyether-polyester block copolymer, (ii) further polymerizing in a solid phase said polyether-polyester block copolymer at a temperature of below 250° C. under a pressure of below 5 mm. Hg, and (iii) melt mixing the so obtained polyether-polyester block copolymer having a melt viscosity which is 0.1–10.0 times that at 290° C. of a synthetic linear polyester with said synthetic linear polyester so that the amount of the polyether segment in the final composition becomes 0.1–10.0% by weight.

17. The process described in claim 16 wherein a polyether-polyester block copolymer having a relative viscosity of at least 2.5 is melt mixed with a synthetic linear polyester.

18. A fiber composed of the polyester composition defined in claim 1 having molecular orientation.

19. A film composed of the polyester composition defined in claim 1 having molecular orientation.

20. A shaped article composed of the polyester composition defined in claim 1.

References Cited

UNITED STATES PATENTS

| | | | |
|---|---|---|---|
| 3,355,413 | 11/1967 | Kiefer | 260—860 |
| 3,381,057 | 4/1968 | Senoo et al. | 260—860 |
| 3,410,927 | 11/1968 | Crovatt | 260—860 |

FOREIGN PATENTS

| | | | |
|---|---|---|---|
| 956,833 | 4/1964 | Great Britain | 260—860 |

OTHER REFERENCES

Chem. Absts., vol. 70, 1969, 78778Z, Fpnahashi et al., Poly(ether esters).

WILLIAM H. SHORT, Primary Examiner

E. WOODBERRY, Assistant Examiner

U.S. Cl. X.R.

260—DIG. 17